United States Patent Office 3,042,005  
Patented July 3, 1962

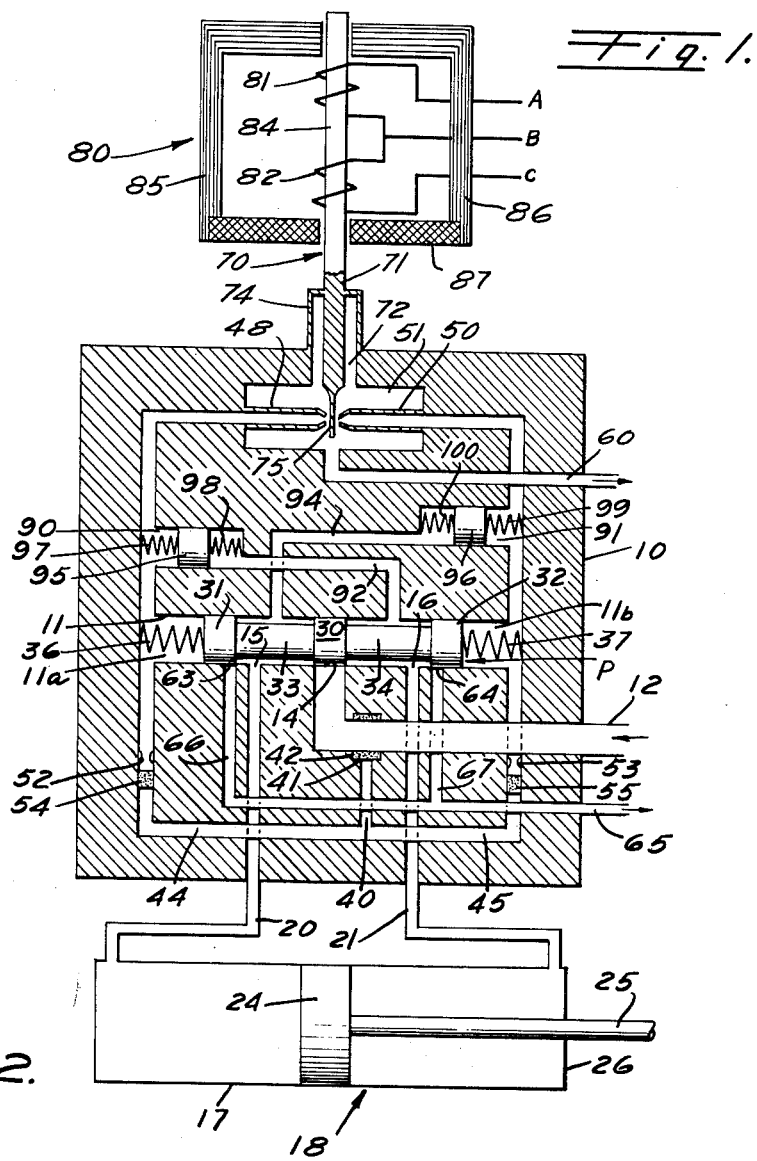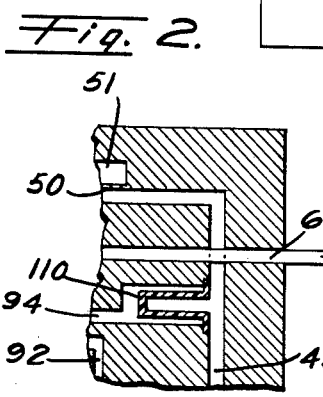

3,042,005  
DYNAMIC PRESSURE FEEDBACK SERVO VALVE  
Samuel A. Gray, Burbank, Calif., assignor to Hydraulic Research and Manufacturing Company, Burbank, Calif., a corporation of California  
Filed Apr. 28, 1959, Ser. No. 809,429  
3 Claims. (Cl. 121—41)

This invention relates generally to servomechanisms and relates more particularly to servomechanisms for hydraulic control systems and the like.

Servomechanisms for controlling hydraulic actuators used in controlling vehicles of various types which pass through the earth's atmosphere and/or beyond require extreme accuracy in their operations and certain problems have been encountered in securing and maintaining the high degree of accuracy required.

For example, in intercontinental ballistic missile the engine itself is moved for guiding same. Such engines or prime movers are heavy and their inertia is very substantial and under certain conditions, they have a resonant frequency that makes for instability in the actions of the missiles and is highly undesirable.

It is, therefore, an object of the present invention to provide a servo valve mechanism for controlling hydraulic actuators wherein the overall reliability thereof is greatly improved.

It is another object of the invention to provide an integrated change in power to a hydraulic prime mover the load of which has large inertia.

Still another object of the invention is to provide a mechanism of this character having greatly improved damping characteristics so that the actuators have maximum stability.

A further object of the invention is to provide a device of this character having a dynamic type valve.

A further object of the invention is to provide apparatus of this character having adequate system stiffness.

Another object of the invention is to provide mechanism of this character having an extremely fast response.

Still another object of the invention is to provide a servo valve mechanism of this character that is extremely simple in construction and operation.

A further object of the invention is to provide mechanism of this character that is relatively inexpensive to manufacture.

A still further object of the invention is to provide mechanism of this character wherein maintenance costs are relatively low.

The characteristics and advantages of the invention are further sufficiently referred to in connection with the following detailed description of the accompanying drawings which represent certain embodiments. After considering this example, skilled persons will understand that variations may be made without departing from the principles disclosed and I contemplate the employment of any structures, arrangements or modes of operation that are properly within the scope of the appended claims.

Referring to the drawing:

FIG. 1 is a schematic sectional view of a servo and actuator mechanism embodying the present invention; and FIG. 2 is a fragmentary sectional view of an alternative change of load sensing means.

Referring more particularly to the drawing, there is shown a housing 10 having a bore 11 for a power valve, indicated generally at P.

There is a fluid pressure supply passage 12 in the body, said passage 12 being connected to any suitable source of fluid pressure, not shown. The passage 12 has a connection with the bore 11 through a port 14 intermediate the ends of the bore 11 and substantially at the longitudinal center thereof. At each side of the port 14 and spaced longitudinally therefrom a substantially equal distance are ports 15 and 16 which are connected to a cylinder 17 of an actuator, indicated generally at 18, the port 15 being connected to one end of the cylinder 17 by means of a conduit 20 while the port 12 is connected to said cylinder 17 adjacent the opposite end thereof by means of a conduit 21. Within the cylinder 17 is operably disposed a piston 24 having one end of a piston rod 25 connected thereto. The piston rod 25 extends through a wall 26 at one end of the cylinder 17 in the usual wellknown manner. The valve P comprises a central spool 30 which, when said valve P is centered as shown in the drawing, closes the port 14. There are end valve spools 31 and 32 in axial alignment with the valve spool 30 and said end spools 31 and 32 are connected to the central spool 30 by axially arranged reduced diameter parts 33 and 34 respectively. When the spool 30 is centered in the bore 11, the spools 31 and 32 are spaced somewhat outwardly of the ports 15 and 16. Normal centering of the valve P is effected by springs 36 and 37 in the end portions of the bore 11. The bore 11 is substantially longer than the valve P so as to provide outer end portions or spaces which permit operative movements of the valve longitudinally in the bore 11 and these portions or spaces provide room for the springs 36 and 37, said outer end portions or spaces of the bore further serve as pressure chambers identified herein as chambers 11a and 11b.

The hydraulic control system includes a conduit 40 one end of which is connected to an annular chamber 41 having a filter 42 therein, said chamber 40 communicating with the pressure supply passage 12. The other end of the conduit 40 is connected to a pair of branch conduits 44 and 45 respectively. Branch conduits 44 and 45 are connected to the respective chambers 11a and 11b of the bore 11 and are also connected with respective, oppositely arranged nozzles 48 and 50 which extend into a chamber 51 in the body 10, said nozzles 48 and 50 being axially aligned with their adjacent ends open and spaced apart. Upstream of the point of connection of the conduits 44 and 45 with the respective chambers 11a and 11b of the bore 11 are respective restricted and calibrated orifices 52 and 53 and upstream of said orifices are respective filters 54 and 55 which are between the orifices 52 and 53 and the point of connection of the conduits 44 and 45 with the conduit 40.

Chamber 51 is provided with a return passage 60 in the body 10, said return passage leading to a suitable reservoir or the like for pressure fluid discharged into the chamber 51 from the nozzles 48 and 50. The fluid pressure system for the actuator has a fluid return arrangement which includes return ports 63 and 64 respectively of the bore 11. These ports are connected to a return line 65 by respecitve conduits 66 and 67. The port 63 is spaced longitudinally outwardly of the port 15 and when the valve P is in its normal centered position, the port 63 is closed by the spool 31. Port 64 is spaced outwardly of the port 16 and is covered by the spool 32 when said valve P is centered. Ports 63 and 64 are so related to the spools 31 and 32 that movement of the valve P in the bore 11 in either direction will immediately uncover one or the other of the ports 63 or 64, depending on the direction of movement of said valve.

Control of the discharge of fluid from the nozzles 48 and 50 is controlled by a flapper valve, indicated generally at 70, said flapper valve including a stem 71 which has its lower end extending into a bore 72 from the chamber 51 to the exterior of the housing, said bore 72 being of substantially greater diameter than the diameter of the stem to permit operative movement thereof. The lower end portion of the stem 71 is sealed to prevent leakage therepast by means of a tubular, isolation diaphragm 74 which provides a flexible, pivotal support for said stem as well as the seal therefor. An example of such a diaphragm is disclosed in the Baltus et al. application, Serial No. 647,255, filed March 25, 1957. The inner or lower end of the stem 71 has a flattened leaf 75 the plane of which is normal to the axes of the nozzles 48 and 50, said leaf extending longitudinally of the lower end of the stem and being disposed between the open ends of the nozzles 48 and 50. Normally, the leaf 75 is positioned substantially an equal distance from the open ends of the nozzles 48 and 50.

Various means may be used to actuate the valve 70 by actuation of the upper portion of the stem 71 which pivots at the isolation diaphragm, the stem 71 being movable clockwise and counterclockwise, as viewed in the drawing, to move the leaf 75 toward and away from the open ends of the nozzles 48 and 50.

One means for actuating the valve 70 comprises a torque motor, indicated generally at 80, and comprising coils 81 and 82. Coil 81 is connected to suitable electrical equipment, not shown, by wires B, A while coil 82 is likewise connected to suitable electrical equipment, not shown, by wires B, C.

The upper portion 84 of the stem 71, exterior of the diaphragm 74, comprises an armature which is operably disposed relative to the coils 81 and 82 so that energization of either of said coils will effect operative movements of the armature 84 and stem 71 clockwise or counterclockwise according to which of said coils is energized. It is to be understood that the armature is of suitable material to be magnetically actuated, such material being a soft steel or the like for example. The torque motor 80 also includes a pair of oppositely arranged frames 85 and 86 which are in the general shape of inverted L.'s. The lower ends of the frames 85 and 86 are operably attached in the usual well-known manner to a magnet 87 having an opening 88 therein through which the stem 71 extends. The adjacent free ends of the horizontal portions of the frames 85 and 86 are spaced apart with the upper end of the armature 84 operably disposed therebetween. The space between said free ends of the frames 85 and 86 is sufficiently great to permit proper operative movements of said armature and said adjacent ends of the frames 85 and 86 are of opposite polarity, one being a south pole and the other being a north pole.

As pointed out above, the valve 70 is actuated when an electrical input signal is transmitted from a suitable sensing device to one or the other of the coils 81, 82. Should the coil 81 be provided with such input signal, the armature 84 is attracted by the frames in accordance with the value of said signal and said stem 71 will be moved counterclockwise, pivoting at the isolation diaphragm 74 so that the flapper leaf 75 will move toward the open end of the nozzle 50 and restrict flow of fluid therefrom to effect a build-up of fluid pressure downstream of said nozzle and in the chamber 11b. Thus, the pressure in the passage 45 downstream of the restricted orifice 53 increases relative to the pressure in the branch passage 44 downstream of the orifice 52 and in the chamber 11a so that there is an unbalancing of the pressures acting at opposite ends of the valve P with the higher pressure acting on the outer face of the spool 32 so that said valve P will move to the left, as viewed in the drawing. This movement of the valve P will cause uncovering of the port 14 so that pressure fluid will flow into the annular space between the part 32 of the spool and the adjacent wall portion of the bore 11. This pressure fluid will pass through the port 16, into the conduit 21 and into that portion of the cylinder 17 which is at the right of the piston 24 as viewed in the drawing. Simultaneously with the opening of the port 14 the spool 31 will move sufficiently to uncover the port 63 so that pressure fluid at the opposite end of the cylinder 17 will flow through the conduit 20, the annular space between the part 33 of the valve P and the adjacent wall portion of the bore 11, through the port 63, conduit 66 and return conduit 65 as the piston moves toward the left due to the higher pressure at the right-hand side thereof. Should a reverse action of the piston 24 be required the electrical signal from the sensing means, above referred to, will energize the coil 82 to cause the stem 71 to be moved clockwise to effect a restriction of the outlet of the nozzle 48 according to the strength of the signal. This will cause a pressure build-up in the conduit 44 downstream of the orifice 52 which will cause the valve P to move toward the right and effect delivery of pressure fluid to the left-hand side of piston 24 and opening of the return port 64 to permit exhaust of pressure fluid from that portion of the cylinder at the right of said piston.

In order to remove foreign particles entrained in the fluid used to operate the hydraulic control system, the branch passages 44 and 45 are provided with the filters 54 and 55 upstream of the restricted orifices 52 and 53 respectively.

The hydraulic system also includes a load feed-back arrangement comprising cylindrical bores 90 and 91 in the body 10. One end of the cylindrical bore 90 is connected to the branch conduit 44 and the other end thereof is connected by means of a passage 92 with the bore 11 at a location communicating at all times with the annular space between the reduced diameter part 34 of the valve P and the adjacent wall portion of the bore 11. The cylindrical bore 91 has one end connected with the branch passage 45 downstream of the restricted orifice 53 thereof. The opposite end of said cylindrical bore 91 is connected by means of a passage 94 with the bore 11 at a point communicating with the annular space between the reduced part 33 of the valve P and the adjacent wall portion of said bore 11. Within the cylindrical bores 90 and 91 are respective pistons 95 and 96 having a normal position intermediate the ends of the cylindrical bores 90 and 91. The piston 95 is maintained in said normal position by means of springs 97 and 98 at opposite sides thereof which urge the piston in opposite directions with a force balanced when said piston is in said normal position. The piston 96 is similarly acted upon by springs 99 and 100.

The pistons 95 and 96 sense changes of actuator load. The sensing is such that this change in differential pressure on valve P caused by pistons 95, 96 is opposite in sign compared to pressure generated by valve 70.

For example, it will be assumed that the valve 70 has been actuated counterclockwise in step fashion to restrict flow from the nozzle 50, thereby effecting an increase in pressure in the nozzle circuit downstream of the orifice 53 which causes the valve P to be moved toward the left, as viewed in the drawing. This movement of the valve P causes pressure fluid to actuate the piston 24 to the left and said piston is prevented from oscillating because of load characteristics by a compensating pressure build-up in that portion of the cylinder 17 at the left of the piston 24, said compensating pressure build-up being effected by leftward movement of the piston 96 due to the increase in pressure in the conduit 45 downstream of the restricted orifice 53.

Should the valve 70 be actuated in the opposite direction, the valve P would be moved toward the right so that pressure fluid would actuate the piston 24 toward the right. Overrunning of the piston 24 would be prevented by the action of the piston 95 as a result of the pressure build-up in the passage 44 downstream of the orifice 52. Thus, the piston 24 is prevented from oscillating because of load characteristics by the action of the pistons 95 and 96 according to which part of the system is energized.

It is to be understood, of course, that other means for sensing changes of load may be employed instead of the pistons 95 and 96. For example, resilient, compliant members may be used such as shown at 110 in FIG. 2. While only one of said members 110 is shown in FIG. 2, it is to be understood that such members may be used instead of the pistons 95 and 96 and such members will sense changes in load and will expand upon an increase in pressure in the respective branch passageways 44 and 45 downstream of the respective orifices 52 and 53. Such expansion will cause an increase in pressure in the passages 92 and 94 respectively according to which of the load sensing means is energized.

It is thought that the invention and many of its attendant advantages will be understood from the foregoing description and it is believed that it will be apparent that various changes may be made in the form, construction and arrangement of the parts of the invention without departing from the spirit and scope thereof or sacrificing all of its material advantages, the embodiments hereinbefore described being merely for purposes of illustration.

I claim:

1. In a hydraulic control mechanism: a fluid pressure actuator mechanism adapted to be connected to a device to be actuated, said actuator having a part movable in opposite directions by fluid pressure; an actuator fluid pressure conduit system connected with said actuator mechanism for supplying pressure fluid to selectively operate said part in opposite directions; control means for controlling said fluid pressure in said conduit system, said means including a valve; yielding means normally balancing said valve at a neutral position whereat pressure fluid to said actuator is cut off; a hydraulic control system for said control means including a main supply passageway and branch passageways from said main passageway, said branch passageways being connected to normally apply fluid pressure of equal value to the opposite ends of said valve and having respective restricted orifices therein upstream of said connection; means downstream of the connections of said branch passageways to vary the pressure in one of said branch passageways relative to the pressure in the other of said branch passageways; and load feed-back means comprising a pair of cylinders each having one end connected to a respective branch passageway downstream of the orifice thereof; a piston slidably mounted in each of said cylinders; yielding means for each piston normally holding the respective pistons in a neutral position; and conduits for said cylinders connecting the other ends thereof with the actuator pressure system to apply a corrective pressure to respective sides of the movable part of the actuator urging same in a direction opposite to the direction of movement imparted by pressure fluid for moving said part to actuate said device to be actuated.

2. A hydraulic control mechanism for controlling fluid pressure to a hydraulic actuator having a part adapted to be actuated in opposite directions by hydraulic actuating pressure, comprising: means defining a cylinder having a pressure fluid inlet adapted to be connected with a source of fluid pressure, fluid pressure outlets at opposite sides of the inlet and spaced therefrom longitudinally with respect to said cylinder and ports at opposite sides of said inlet adapted to be connected to an actuator; a spool valve slidably disposed in said cylinder and having a central part normally closing the inlet to said cylinder and controlling same and end parts normally closing the respective outlets from said cylinder, the ports for connection with the actuator being open; yielding means normally maintaining the valve in said normal position whereat the inlet and said outlets are closed; a hydraulic nozzle system including a pair of passageways having a connection with said source of pressure, said passageways having respective restricted orifices therein and connections with said cylinder at respective ends thereof; nozzles for said passageways, said nozzles having their open ends spaced apart; valve means for controlling the flow of fluid from said nozzles to thereby vary the pressures in said passageways downstream of said orifices; and load feedback means including a movable wall for each of said passageways, each wall being subjected on one side to the pressure in its respective passageway downstream of the orifice thereof, the other side of each of said wall means having a fluid connection with the cylinder at a position intermediate the inlet and one of the outlets respectively, said connections being so arranged that upon an increase in pressure in one of the passageways to effect actuation of the valve member to open the inlet and provide actuating pressure to one of the ports said movable wall is moved by said increased pressure to apply a corrective pressure at the side of the part of the valve controlling the inlet opposite the port being supplied with pressure fluid; and yielding means for each of said movable walls normally maintaining same in a balanced position.

3. In a hydraulic control mechanism for controlling fluid pressure to a hydraulic actuator having a part adapted to be actuated in opposite directions by hydraulic actuating pressure: means defining a cylinder having a pressure fluid inlet adapted to be connected to a source of fluid pressure, fluid pressure outlets at opposite sides of the inlet and spaced therefrom longitudinally with respect to said cylinder and ports at opposite sides of said inlet adapted to be connected to an actuator; a valve member slidably disposed in said cylinder and having a part normally closing the inlet to said cylinder and controlling same and other parts normally closing the respective outlets from said cylinder, the ports for connection with the actuator being open; yielding means normally maintaining the valve in said normal position whereat the inlet and said outlets are closed; a hydraulic nozzle system including a pair of passageways having a connection with the source of pressure, said passageways having respective restricted orifices therein and connections with said cylinder at respective ends thereof; means for varying the relative pressures in said passageways downstream of said orifices; and load feed-back means for each passageway, each of said feed-back means being responsive to the pressure in its respective passageway downstream of the orifice thereof and, upon an increase in pressure in its passageway, providing a corrective pressure to the actuator part when the latter is energized.

References Cited in the file of this patent

UNITED STATES PATENTS

| | | |
|---|---|---|
| 2,550,723 | Ross | May 1, 1951 |
| 2,823,689 | Healy | Feb. 18, 1958 |
| 2,889,815 | Lloyd | June 9, 1959 |
| 2,926,696 | Kolm | Mar. 1, 1960 |
| 2,931,389 | Mogg et al. | Apr. 5, 1960 |
| 2,945,478 | Hanna | July 19, 1960 |
| 2,972,338 | Lloyd | Feb. 21, 1961 |